United States Patent
Chamayou et al.

(10) Patent No.: US 9,683,063 B2
(45) Date of Patent: Jun. 20, 2017

(54) PROCESS

(71) Applicant: Ineos Europe AG, Rolle (CH)

(72) Inventors: Jean-Louis Chamayou, Carry le Rouet (FR); Renaud Viguier, Sete (FR); Pierre Sere Peyrigain, Yvac (FR)

(73) Assignee: INEOS EUROPE AG, Rolle (CH)

( * ) Notice: Subject to any disclaimer, the term of this patent is extended or adjusted under 35 U.S.C. 154(b) by 0 days.

(21) Appl. No.: 15/104,399

(22) PCT Filed: Dec. 15, 2014

(86) PCT No.: PCT/EP2014/077778
§ 371 (c)(1),
(2) Date: Jun. 14, 2016

(87) PCT Pub. No.: WO2015/097013
PCT Pub. Date: Jul. 2, 2015

(65) Prior Publication Data
US 2016/0311953 A1 Oct. 27, 2016

(30) Foreign Application Priority Data
Dec. 23, 2013 (EP) .................................... 13199327

(51) Int. Cl.
*C08F 2/00* (2006.01)
*B01J 19/18* (2006.01)
(Continued)

(52) U.S. Cl.
CPC .............. *C08F 210/16* (2013.01); *B01J 19/24* (2013.01); *C08F 2/34* (2013.01);
(Continued)

(58) Field of Classification Search
CPC .......... C08F 2/34; C08F 210/16; C08F 10/10; C08F 2/00; C08F 2/01; C08F 2/007;
(Continued)

(56) References Cited

U.S. PATENT DOCUMENTS

| 5,763,543 A | 6/1998 | Muhle et al. |
| 2012/0136127 A1* | 5/2012 | Hussein ................ B01J 8/22 526/65 |

FOREIGN PATENT DOCUMENTS

| EP | 1 556 415 B1 | 12/2009 |
| EP | 2 374 823 A1 | 10/2011 |

(Continued)

OTHER PUBLICATIONS

Specification of Co-pending National Phase U.S. Appl. No. 15/104,313, filed Jun. 14, 2016: PCT Int'l Application No. PCT/EP2014/077774, WO 2015/097012 A1, filed Jul. 2, 2015: 17 pgs.

Primary Examiner — William Cheung
(74) Attorney, Agent, or Firm — Nixon & Vanderhye P.C.

(57) ABSTRACT

Process for polymerizing olefins in a polymerization reactor system including at least first and second introduction points by which the same reaction component may be introduced directly at different locations on the reactor system. At a first time, the reaction component is introduced through at least the first introduction point, such that a proportion X of the reaction component which is introduced through the first and second introduction points is introduced through the first introduction point. At a second, later, time the same reaction component is introduced through at least the second introduction point and such that a proportion Y of the reaction component which is introduced through the first and second introduction points is introduced through the first introduction point. Y is less than X, and at least one of the first and second introduction points is located on the reactor system at a location not on the reactor.

20 Claims, 1 Drawing Sheet (51) Int. Cl.
    *C08F 210/16*    (2006.01)
    *C08F 2/34*      (2006.01)
    *B01J 19/24*     (2006.01)
    *C08F 10/00*     (2006.01)

(52) U.S. Cl.
    CPC .. *B01J 2219/00164* (2013.01); *B01J 2219/24* (2013.01); *C08F 10/00* (2013.01); *Y02P 20/582* (2015.11)

(58) Field of Classification Search
    CPC ............... B01J 19/24; B01J 2219/24; B01J 2219/00164; Y02P 20/582
    USPC ................ 526/65, 67, 70; 422/134, 135
    See application file for complete search history.

(56) References Cited

FOREIGN PATENT DOCUMENTS

| | | |
|---|---|---|
| WO | WO 94/28032 A1 | 12/1994 |
| WO | WO 99/61486 A1 | 12/1999 |
| WO | WO 01/18066 A1 | 3/2001 |
| WO | WO 2005/068507 A1 | 7/2005 |
| WO | WO 2006/054040 A1 | 5/2006 |
| WO | WO 2008/108931 A1 | 9/2008 |
| WO | WO 2008/141965 A1 | 11/2008 |
| WO | WO 2010/057925 A1 | 5/2010 |
| WO | WO 2011/011427 A1 | 1/2011 |
| WO | WO 2013/082693 A1 | 6/2013 |
| WO | WO 2013/098197 A1 | 7/2013 |

* cited by examiner

PROCESS

This application is the U.S. national phase of International Application No. PCT/EP2014/077778 filed Dec. 15, 2014 which designated the U.S. and claims priority to European Patent Application No. 13199327.1 filed Dec. 23, 2013, the entire contents of each of which are hereby incorporated by reference.

The present invention relates to a process for the polymerisation of olefins in a polymerisation reactor system and in particular to the introduction of reactants and other components into the reactor system.

BACKGROUND OF THE INVENTION

The polymerisation of olefins by bringing them into contact with a catalyst system in a reactor system comprising a slurry phase reactor is known. In a typical slurry phase polymerisation process a slurry of polymer solids in a liquid diluent is circulated in a loop reactor to which fresh catalyst and reactants are added, and from which is withdrawn a slurry of polymer solids in the diluent.

Polymerisation is generally performed continuously; although the catalyst system and make-up reactants may be introduced into the reactor continuously or discontinuously as required. The polymer produced may also be withdrawn from the reactor either continuously or discontinuously as required.

The polymer produced is withdrawn as slurry of polymer solids in the diluent. The diluent and other reaction components therein are separated from the polymer solids, and recycled to the reactor.

Cooling of the reactor is necessary to remove the exothermic heat of reaction. In a loop reactor this is achieved by flowing a cooling fluid, generally water, through jackets disposed about the legs of the reactor.

The polymerisation of olefins by bringing them into contact with a catalyst system in a reactor system comprising a gas phase reactor is also known. In a fluidised bed gas phase polymerisation process, for example, a bed of polymer is maintained in a fluidised state by an ascending stream of fluidisation gas comprising the olefin, which gas exits the reactor and is then recycled.

The start-up of the polymerisation reaction in the gas phase is generally performed by introducing a pre-formed bed of polymer, known as a seedbed, to the reactor, fluidising this seedbed and forming a reaction gas mixture in the reactor, and then introducing a catalyst to initiate reaction.

Polymerisation may then be performed continuously; the catalyst system and make-up reactants and other reaction gas mixture components being introduced into the reactor continuously or discontinuously as required. The polymer produced may be withdrawn from the reactor either continuously or discontinuously. The pre-formed seedbed forms the initial fluidised bed but as reaction takes place and polymer solids are withdrawn this is eventually replaced by a bed of the formed polymer.

The gas leaving the reactor is generally cooled before being recycled back to the reactor. In preferred processes it is cooled below a temperature at which liquid components condense out of the gas stream, and both the liquid and gaseous phases are recycled, wherein the vaporisation of the condensed liquid components in the reactor provides significant cooling to the reaction. The formation of condensed liquid from the gas exiting the reactor and the introduction of this condensed liquid into the reactor is generally known as "condensed mode" operation.

Numerous components can be added to the reaction during polymerisation. Obviously, monomers, and any comonomers, and catalyst have to be added to replace consumed components, but other components, such as hydrogen, activators and antistatic agents may also be added at various times.

It is known to introduce components to the reactor at multiple locations within a reactor.

SUMMARY OF THE INVENTION

We have now found that it can be advantageous to introduce components at multiple locations where at least one location is outside of the reactor, and further wherein the rate at which a component is introduced at different locations is changed during the process.

Thus, in a first aspect, the present invention provides a process for the polymerisation of olefins in a polymerisation reactor system, the polymerisation reactor system comprising at least first and second introduction points by which the same reaction component may be introduced directly at different locations on the reactor system, wherein (i) at a first time the reaction component is introduced through at least the first introduction point and such that a proportion X of the reaction component which is introduced through said first and second introduction points is introduced through the first introduction point, and (ii) at a second, later, time the same reaction component is introduced through at least the second introduction point and such that a proportion Y of the reaction component which is introduced through said first and second introduction points is introduced through the first introduction point, wherein Y is less than X, and further wherein at least one of the first and second introduction points is located on the reactor system at a location not on the reactor.

It is a feature of this aspect of the present invention that at a first time the reaction component is introduced through at least the first introduction point and such that a proportion X of the reaction component which is introduced through said first and second introduction points is introduced through the first introduction point.

The proportion X is the amount of the reaction component introduced through the first introduction point divided by the total amount of the reaction component introduced through both said first and second introduction points as measured at the first time. Suitably, the flow rates through the first and second introduction points can be determined as mass flow rates. However, any suitable units can be used since the proportion is unit-less i.e. the same result is obtained if the calculation is based on mass flow or molar flow rates.

Similarly, the proportion Y is the amount of the reaction component introduced through the first introduction point divided by the total amount of the reaction component introduced through both said first and second introduction points as measured at the second time. It should be noted that Y can be zero i.e. there may be no reaction component introduced through the first introduction point at the second time. Nevertheless the same calculation is used for the proportion Y as for X (except at different times) so that X and Y can be directly compared.

The proportion of the reaction component introduced through the first introduction point can generally be represented as a number between 0 and 1, with 0 corresponding to none of the reaction component being passed through the first introduction point, and 1 corresponding to all of the reaction component (which is introduced through the first and second introduction points) being introduced through the first introduction point.

Alternatively, the proportion of the reaction component introduced through the first introduction point can be represented as a percentage of the total introduced through both the first and second reaction points.

In general, X cannot be 0 (or 0%) because it must be more than Y and because it is required that at least some of the reaction component is introduced through the first introduction point at the first time. Similarly, Y cannot be 1 (or 100%) because it must be less than X and because it is required that at least some of the reaction component is introduced through the second introduction point at the second time. Thus, $0<X\leq1$ and $0\leq Y<1$ (and $Y<X$).

Alternatively, as percentages, $0\%<X\leq100\%$ and $0\%\leq Y<100\%$ (and $Y<X$).

When X and Y are represented as numbers between 0 and 1, X is preferably greater than 0.2, for example greater than 0.5, and most preferably greater than 0.8. The preferred value of Y can depend on X, but is preferably less than 0.5, and more preferably less than 0.2.

When represented as percentages, X is preferably greater than 20%, for example greater than 50%, and most preferably greater than 80%. Y can depend on X as noted, but is preferably less than 50%, and more preferably less than 20%.

When X and Y are represented as numbers between 0 and 1, Y is preferably less than or equal to $X-0.1$, more preferably less than or equal to $X-0.2$, and most preferably less than or equal to $X-0.5$.

When X and Y are represented as percentages, Y is preferably less than or equal to $X-10\%$, more preferably less than or equal to $X-20\%$, and most preferably less than or equal to $X-50\%$. For example, if X is 100%, then Y is preferably less than or equal to 90%, more preferably less than or equal to 80%, and most preferably less than or equal to 50%.

In one embodiment flow can be switched entirely from introduction through the first introduction point but not the second introduction point at the first time, to introduction through the second introduction point but not the first introduction point at the second time.

Further, in a second aspect, the present invention provides a process for the polymerisation of olefins in a polymerisation reactor system, the polymerisation reactor system comprising at least a first introduction point and a second introduction point by which the same reaction component may be introduced directly at different locations on the reactor system, wherein at a first time the reaction component is introduced through the first introduction point but not the second introduction point, and at a second, later, time the same reaction component is introduced through the second introduction point but not the first introduction point.

This second aspect provides a process where the introduction of the reaction components is switched entirely from introduction through the first introduction point but not the second introduction point at the first time, to introduction through the second introduction point but not the first introduction point at the second time. In this second aspect both the first and second introduction points can be located on the reactor.

Where at least one of the first and second introduction points are located on the reactor system at a location not on the reactor then this is an embodiment of the first aspect of the present invention.

In another (third) aspect, the present invention also provides a polymerisation reactor system comprising:

(a) a first introduction point connected to a source of a reaction component and by which the reaction component may be introduced directly to the polymerisation reactor system at a first location, (b) a second introduction point connected to the same source of a reaction component and by which the reaction component may be introduced directly to the polymerisation reactor system at a second location different to the first location, and (c) a control system which controls the supply of the reaction component to the polymerisation reactor system and which prevents the reaction component being introduced through both the first and second introduction points at the same time.

This third aspect provides a polymerisation reactor system suitable for performing the process of the second aspect.

More generally the present invention relates to reaction component addition at different locations on a polymerisation reactor system. For avoidance of doubt it should be noted that the polymerisation reactor system is a circulating system, and hence addition of components in one location can lead to such components passing to other locations. The first and second introduction points allow the reaction component to be introduced at first and second locations, and the term "introduced" as used hereinafter refers to the reaction component being introduced into the reactor system at a particular location, and does not refer to reaction component which has been introduced elsewhere and then passed to another location within the circulating system. Even if the term "directly" is not used in every instance in the present application, any reference to introduction or addition at a particular location can be taken to refer to the reaction component being introduced directly at said location.

The polymerisation reactor system according to the present invention comprises a reactor. The reactor will generally have one or more withdrawal lines for withdrawing polymer product. Typically there will also be some form of polymer separation system by which polymer withdrawn in the one or more withdrawal lines can be separated from other reaction components, such as unreacted monomers and inerts, and a recycle system by which these reaction components can then be recycled to the reactor. Other polymerisation reaction systems may have additional parts by which materials are recovered from the reactor and/or are recycled to the reactor which are specific to the particular polymerisation process, and the term "polymerisation reactor system" as used herein encompasses all such parts of the process. According to the present invention at least one of the first and second introduction points is located on one of said parts of the polymerisation reactor system other than the reactor, such as in a polymer separation system, a recycle system or any other part of the polymerisation reactor system by which materials are recovered from the reactor and/or are recycled to the reactor.

The "polymerisation reactor system" according to the present invention, which may also be referred to herein as "reactor system", is preferably a polymerisation reactor system for the gas phase polymerisation of olefins. More preferably, the "polymerisation reactor system" comprises (i) a gas phase reactor having a gas outlet and one or more withdrawal lines for withdrawal of a polymer-containing stream, (ii) a recycle loop for recycling gas exiting the reactor through the gas outlet back to the reactor, (iii) a polymer separation system for separating reactants from the polymer product in the withdrawn polymer-containing stream, and (iv) a recycle system for recycling reactants removed from the reactor in the withdrawn polymer-containing stream back to the reactor.

The term "recycle loop" refers to the entire system by which the gas exiting the reactor through the gas outlet is recycled back to the reactor. For avoidance of doubt this includes the possibility, which is in fact preferred, that a portion of the gas is cooled and condensed to form liquid before it is recycled to the reactor. The recycle loop will usually include a compressor for compressing the gas to be recycled. The term "recycle loop" also includes any vents on the recycle loop. The recycle loop can include fresh feed lines if fresh feed is passed to the reactor by mixing with a recycle stream which is part of the recycle loop.

The term "polymer separation system" refers to the system by which reactants are separated from polymer product in the withdrawn polymer-containing stream. The polymer separation system will comprise one or more processing steps in which this separation occurs. These can include lock hoppers for product withdrawal and what are known in the art as degassing and/or purging steps for subsequent polymer treatment.

The term "recycle system" refers to the entire system by which reactants removed from the reactor in the withdrawn polymer-containing stream and subsequently separated therefrom are recycled back to the reactor. The recycle system may recycle streams back to the recycle loop rather than directly back to the reactor. As used herein, reference to the recycle system recycling "back to the reactor" includes that the recycle can take place via the recycle loop, and in this case, for the purposes of the present invention, the recycle system is considered to end at the recycle loop. (Any subsequent components, vessels or steps and pipes by which recycle to the reactor occurs are part of the recycle loop.) The recycle system may, and typically does, recycle different recycle streams from different processing steps in the polymer separation system. The streams may include both gaseous and liquid recycle streams depending on the processing step, and in particular the stream pressure, temperature and composition. The term "recycle system" also includes any vents on the recycle system. The recycle system can include fresh feed lines if fresh feed is passed to the reactor or the recycle loop by mixing with a recycle stream which is part of the recycle system.

BRIEF DESCRIPTION OF THE DRAWINGS

This may be illustrated with respect to FIG. 1, which is a schematic of an apparatus suitable for the present invention and is provided to illustrate some of the terms defined above.

DETAILED DESCRIPTION OF THE INVENTION

Figure 1:
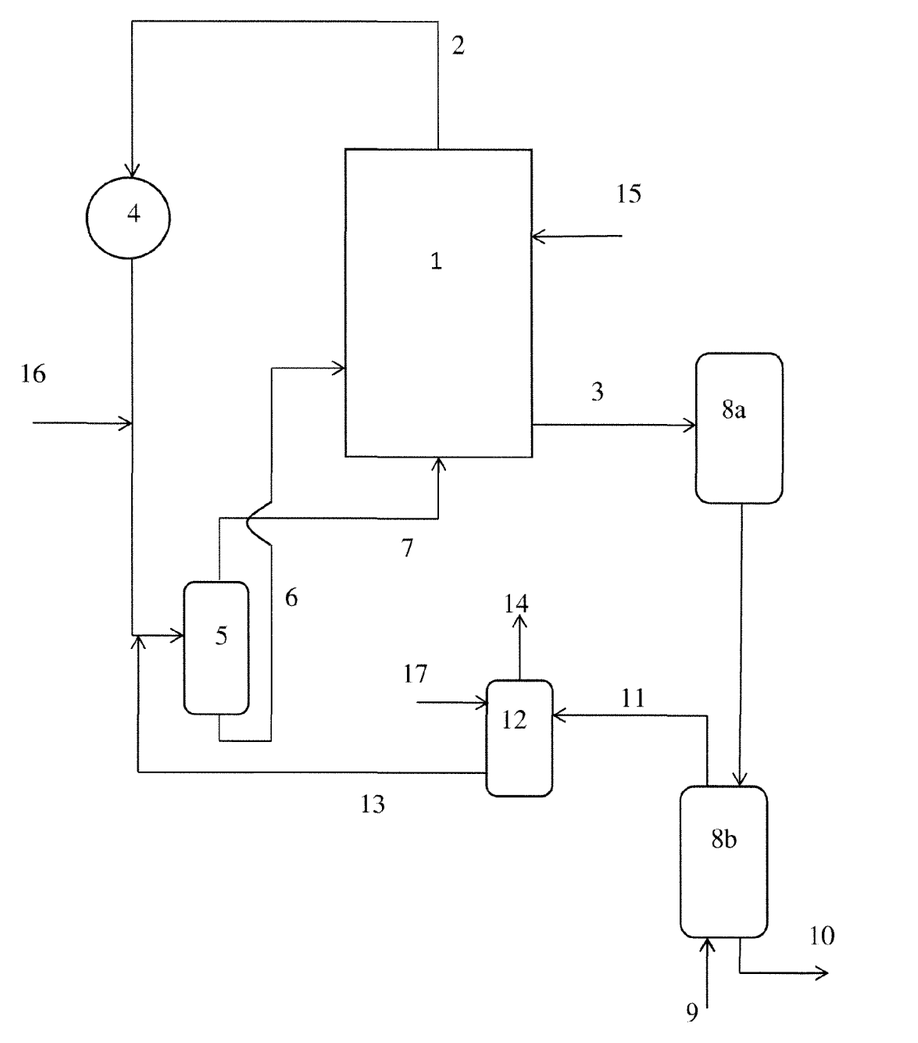

Thus, with respect to FIG. 1, there is shown a gas phase reactor (1), having a gas outlet (2) and a withdrawal line for withdrawal of a polymer-containing stream (3). The reactor system comprises a recycle loop comprising a condenser (4) and a separator (5), for separating condensed liquid from non-condensed gas. The recycle loop also comprises a liquid recycle line (6) for passing condensed liquid back to the reactor (1) and a gas recycle line (7) for passing the non-condensed gas back to the reactor (1). The gas recycle line (7) will usually include a compressor (not shown) for compressing the gas to be recycled.

The polymer-containing stream withdrawn through line 3 is passed to a polymer separation system having processing steps represented schematically by vessels (8a) and (8b). In particular, vessel (8a) represents schematically one or more lock hoppers which are vessels commonly used to aid withdrawal of the polymer from the high pressure in the reactor (1) with a minimum of gaseous reactants, and vessel (8b) represents schematically one or more degassing steps. With respect to (8b) the withdrawn polymer is contacted with a recycled nitrogen-containing purge gas, which purge gas is introduced via line (9) in FIG. 1. Degassed polymer is withdrawn via line (10) and passed for further processing, such as extrusion (not shown).

A mixture of purge gas and separated reactants including unreacted olefin are recovered from the one or more degassing steps (8b) via line (11), and passed to an olefin recovery system represented schematically by vessel (12).

Recovered reactants including olefin are passed via line 13, which can pass directly back to the reactor (1) but in FIG. 1 is shown connecting to the recycle loop, and in particular to the line just upstream of the separator (5), and from there the reactants are recycled to the reactor (1).

Components including nitrogen which have been separated from the recovered olefin are removed via line (14). At least a portion of this stream may be recycled to line (9) and used as the purge gas (not shown).

Also shown in FIG. 1 are three potential feed lines for introducing a reaction component to the reactor system. Thus, line (15) can introduce components directly to the reactor; line (16) can introduce reaction components in the recycle loop between the condenser (4) and the separator (5); and line (17) can introduce reaction components into the olefin recovery system (12).

As an Example, discussed further below, a comonomer could, at a first time, be introduced directly into the reactor via line (15) and this would then be the first introduction point. At a second time direct feed of comonomer via line (15) could be stopped and comonomer could instead be introduced to the reactor system via the olefin recovery system (12) via line (17).

As shown in FIG. 1 and as defined herein, each of 1-14 are part of the reactor system, whereas lines 15-17 are not. In particular, 2 and 4-7 represent the recycle loop, 8a and 8b represent the polymer separation system, and 11-13 represent the recycle system. As defined herein the recycle system ends at the point where line 13 meets the recycle loop upstream of the separator (5).

The at least one location at which at least one of the first and second introduction points is located which is part of the reactor system other than the reactor in the first aspect of the present invention will preferably be at least one location where the reaction component is introduced directly into one or more of the recycle loop, the polymer separation system and the recycle system.

Whilst an object of the first aspect of the present invention is specifically to introduce a reaction component at a location outside of the reactor, it is worth noting that via such locations the introduced reaction component may end up also being passed to the reactor but only indirectly, and in particular only via a recycle line (either via the recycle loop or the recycle system).

Accordingly, the at least one location which is part of the reactor system other than the reactor is such that the reaction component is not passed to the reactor directly nor via any fresh feed lines which themselves feed directly to the reactor e.g. fresh comonomer feed line to the reactor.

Preferably, the at least one location which is part of the reactor system other than the reactor is such that the reaction component introduced at this location is not introduced directly in any line, even in the recycle loop or recycle system, which line itself feeds directly to the reactor. A line is considered to feed directly to the reactor if there are no intermediate equipment between it and the reactor.

The term "equipment" as used herein means, exclusively, vessels, pumps, compressors and condensers. Preferably, therefore, the at least one location which is part of the reactor system other than the reactor is such that reaction component is introduced into equipment which is in the recycle loop, in the polymer separation system or in the recycle system, or in a line upstream of such equipment (such that it must pass through said equipment before it can be passed to the reactor).

Preferably, the at least one location which is part of the reactor system other than the reactor is such that reaction component is introduced into a vessel which is in the recycle loop, in the polymer separation system or in the recycle system, or in a line or equipment other than a vessel which is upstream of such vessel.

For avoidance of doubt, it should be noted that reaction component may be introduced at locations other than the first and second locations. Where there are more than two locations then any combination of two locations can be considered as the first and second locations if they otherwise meet the requirements of the present invention. (For example, to be considered as first and second injection points, the first injection point must have reaction component introduced there through at the first time, and the second introduction point must have the same reaction component introduced there through at the second time, and at least one of them must be located on the reactor system at a location not on the reactor.)

The preferred locations for introduction of the reaction component will depend on the particular component.

The reaction component according to the present invention may include "antistatic agents", "activity reducers", "modifiers", "activity enhancers and co-catalysts", "scavengers", "comonomers" and "condensing agents". Such compounds and the preferred locations outside of the reactor for their introduction are as follows:

"Antistatic agents" are compounds the presence of which in the reactor reduce static, and are sometime also referred to as "process aid additives". Suitable compounds are known in the art, for example from WO 2000/68274, WO 2001/18066, WO 2001/18067 and WO 2006/54040. Such compounds can be added to the recycle loop, in the polymer separation system and on the recycle system. The preferred locations for such compounds are on the recycle loop.

"Activity reducers" are compounds the presence of which in the reactor reduce the catalyst activity. Such compounds include those which may sometimes be referred to as "killers" or "deactivating agents", although as used herein it is not necessary for such compounds to stop reaction completely. Suitable compounds depend on the catalyst, but known activity reducers include CO, CO2 and water.

Such compounds can be added at anywhere on the recycle loop, in the polymer separation system and on the recycle system. The preferred location for such compounds are any olefin containing recycle streams in the recycle loop or recycle system.

"Modifiers" are compounds the presence of which results in a modification of the polymer product properties, but which are not reactants per se i.e. not a monomer or comonomer. Examples include O2 and H2.

Such compounds can be added anywhere on the recycle loop, in the polymer separation system and on the recycle system. The preferred locations for such compounds are on the recycle loop.

"Activity enhancers and co-catalysts" are compounds the presence of which in the reactor increase the catalyst activity. In general, "activity enhancers" are compounds which are not necessary for the catalyst to work, but the presence of which in the reactor increases the catalyst activity. "Co-catalysts" are compounds which are required for the catalyst to work efficiently, and in particular such compounds generally react with the catalyst to form the active catalyst system. Examples of activity enhancers can be found in WO03082935, WO0228919, EP0703246 and WO2009065677 and include halogenated hydrocarbons, such as n-BuCl and CHCl$_3$ and alkylaluminium halides such as DEAC. Examples of co-catalysts are alkylaluminium compounds such as TEA. Such compounds can be added anywhere on the recycle loop, in the polymer separation system and on the recycle system. The preferred locations for such compounds are on the recycle loop.

"Scavengers" are compounds which are added to react with ("scavenge") impurities in the reactor. Suitable scavengers include alkyl aluminium compounds.

Such compounds can be added anywhere on the recycle loop, on the polymer separation system and on the recycle system. The preferred locations for such compounds are discussed further below.

"Comonomers" are olefins other than the principal monomer it is desired to polymerise. As used herein the "principal monomer" is that which is present in the final product in the largest amount by weight. Examples of comonomers depend on the principal monomer, but for ethylene or propylene polymerisation processes the commonest comonomers are 1-butene, 1-hexene, and 1-octene.

Such compounds can be added anywhere on the recycle loop, in the polymer separation system and on the recycle system. The preferred locations for such compounds are discussed further below.

"Condensing agents" refers to compounds added to the process because they are readily condensed when cooled, and can then be recycled to the reactor in liquid form, wherein they vaporise. Typical condensing agents are alkanes such as isopentane.

Such compounds can be added anywhere on the recycle loop, in the polymer separation system and on the recycle system. The preferred locations for such compounds are on the recycle loop.

The preferred components to which the invention may be applied are scavengers, comonomers and condensing agents. Preferred embodiments using each of these are described below:

A. Scavenger as Reaction Component

In this embodiment, the reaction component to be added at the first and second locations is a scavenger. Scavengers can be used before start-up of a polymerisation reaction to react with and thereby help to remove water and other impurities which can otherwise inhibit polymerisation. Such compounds can, however, also be used during reaction.

It is the case that some compounds can have effect as both scavengers and for other properties. For example, alkyl aluminium compounds can act as both scavengers and as co-catalysts.

For the purposes of this embodiment of the present invention we will refer to such compounds as scavengers even if they also have other properties in the polymerisation process.

In fact, the preferred scavengers according to the present invention are compounds which can act as both scavengers and as co-catalysts.

The preferred scavengers according to the present invention are metal alkyl compounds. Non-aluminium alkyls which may be used include alkyl zinc compounds, such as diethyl zinc, and alkyl boron compounds, such as triethylborane. However, aluminium alkyl compounds are preferred.

Particular examples of alkyl aluminium compounds which can be employed are trialkyl aluminium compounds, such as triethylaluminium (TEA) and triisobutylaluminium (TiBA), and aluminoxane compounds, such as triisobutyl aluminoxane (TiBAO) and methylaluminoxane (MAO).

Mixture of scavengers can also be used. The scavenger can be introduced as a pure compound or, preferably, diluted in an organic solvent (for example in an alkane, especially in an alkane which can be (is) used as a condensing agent in the reaction).

A.1. First Introduction Location

Preferably, the first introduction location when adding a scavenger is a location on the recycle loop or the recycle system.

As one example, one preferred first introduction location is on the gas recycle line to the reactor, and in particular at the discharge of a recycle gas compressor on the gas recycle line to the reactor.

Alternatively, preferred first introduction locations are locations where condensed liquid is or will be present during polymerisation, and most especially into or upstream of any vessels in which condensed liquid may accumulate during polymerisation. Non-limiting examples of such locations are:

1) In or Upstream of a Gas-Liquid Separator on the Recycle Loop

The mixture of gas and liquid obtained after cooling of the gas which has exited the reactor may be passed to a separator wherein at least part of the condensed liquid is separated from the mixture. Such a system is known, for example, from WO 94/28032, and allows liquid and gas streams to be separately returned to the polymerisation reactor.

The scavenger may be introduced into a line upstream of such a separator. For example the scavenger may be introduced in the line between the cooling step and the separator. As another example, fresh comonomer may be passed to the process via a feed line to the separator and scavenger may be introduced in the same line. As a yet further option, the recycle system for recycling reactants separated from the withdrawn polymer back to the reactor may do this via a feed line to the separator, and scavenger can be introduced in this line.

Preferably, the first introduction point in this example is such that scavenger is introduced directly to the separator. Within the separator the scavenger is preferably introduced below the inlet by which the cooled recycle gas is passed into the separator, and most preferably is introduced directly into the liquid phase in the separator.

2) Condenser and Recycle Lines Containing Condensed Olefin in the Olefin Recovery System Polymer which is removed from the reactor entrains with it quantities of reaction gas mixture. These are generally separated from the polymer particles in one or more processing steps in the polymer separation system. The separation usually involves purging of the polymer particles, preferably with an inert gas, and most preferably with nitrogen as already noted. It is desirable to recover unreacted olefins from the purge gas, which necessitates separating them from the purge gas. This generally entails low temperature condensation of the olefins to form liquids which can be separated and recycled. The first location may be any part of this recycle system where the recovered condensed liquid will be present during polymerisation, in particular in the condenser or in recycle lines by which the condensed olefin is recycled to the reactor (which can optionally be via the separator as shown in FIG. 1).

As example of an olefin recovery process can be found in U.S. Pat. No. 7,696,289. In particular FIG. 4 and the associated description describe the recovery and recycle of condensed liquid stream derived at least in part from the purge gas exiting a purge vessel (18).

3) Condenser and Recycle Lines Containing Condensed Olefin in a Vent Recovery System A yet further example of condensed olefin recovery and recycle arises in process vent treatments. Process vents are generally present on a polymerisation process to prevent accumulation of inerts in the process. In general, there may be process vents for both gaseous streams and for liquid streams, the former generally for removing inert gaseous components, such as nitrogen, whilst the latter may be removing inert liquid components, such as 2-hexene. In the present invention process vents may be present on either the recycle loop or on the recycle system, and optionally may be present on both. It can be desired to recover and recycle desired olefins (e.g. ethylene, 1-hexene) in these vents, which for the gaseous vent stream can entail low temperature treatment of the stream to condense the olefins to form liquids.

An example of this is also shown in U.S. Pat. No. 7,696,289, where FIG. 4 also shows a reactor vent (17) being passed to the same steps as the purge gas.

Although shown with a common recovery system in U.S. Pat. No. 7,696,289 it will be apparent that separate recovery steps could be used for process vents and for purge gas treatment.

In particular in this embodiment related to scavenger addition, but also in general terms for other reaction components, it should be noted that the "first time" may be prior to catalyst injection (referred to herein as "pre-start-up") or may be during the start-up phase, the "start-up phase" being defined herein as the time after catalyst injection until the production rate exceeds 50% of the targeted steady-state production rate.

A.2. Second Introduction Location

The second introduction location when using a scavenger will be a different location on the reactor system, and may be either in the reactor itself or a different location on the recycle loop or the recycle system to the first introduction location.

A particularly preferred location for the second injection location is one of the following:
 i) on the reactor itself,
 ii) on the recycle gas line from the separator to the reactor (as long as this is different to the first introduction location) or
 iii) on the recycle liquid line from the separator to the reactor.

(In fact it is preferred that scavenger is introduced into both of the recycle gas line from the separator to the reactor and the recycle liquid line from the separator to the reactor at the second time, and either location may be considered as the second introduction location as long as it is different to the first introduction location.)

As an alternative example, a recycle stream may sometimes be used to aid catalyst injection to a reactor, and the second introduction location may be a location such that scavenger may be introduced into the recycle stream to the catalyst injection nozzle.

The second time is after the first time. In particular in this embodiment related to scavenger addition, but also in general terms for other reaction components the "second time" is preferably when operating at steady-state. However, it should be noted that this does not preclude introduction of scavenger at the second introduction location pre-start-up, during the start-up phase or between the start-up phase and steady-state operation.

B. Comonomer as Reaction Component

In this embodiment, the reaction component to be added at the first and second locations is a comonomer. Comonomers are commonly used in polymerisation to give copolymer products. As used herein the term "monomer" is used to refer to the "principal monomer", which is the component which is present in the final product in the largest amount by weight, and the term "comonomer" is used to refer to olefins other than the principal monomer.

Examples of suitable comonomers depend on the principal monomer, but for ethylene or propylene polymerisation processes the commonest comonomers are 1-butene, 1-hexene and 1-octene.

The preferred locations for such compounds are discussed further below.

B.1. First Introduction Location

Preferably, the first introduction location when adding a comonomer is a location on the recycle loop or the reactor. A particularly preferred location for the first injection location for comonomers is on the reactor itself, or in the recycle loop on the separator, on a feed line to the separator, or on one of either the recycle gas line from the separator to the reactor and the recycle liquid line from the separator to the reactor. A most preferred location for the first injection location is on the reactor itself or on the recycle gas line from the separator to the reactor, and in particular at the discharge of a recycle gas compressor on the gas recycle line to the reactor.

In particular in this embodiment related to comonomer addition, but also in general terms for other reaction components, it should be noted that the "first time" may be prior to catalyst injection (referred to herein as "pre-start-up") or may be during the start-up phase, the "start-up phase" being as defined previously.

B.2. Second Introduction Location

In one example, the second injection location for comonomer addition may be in the recycle loop, and especially in the recycle loop on the separator or on a feed line to the separator (and as long as the second introduction location is different to the first introduction location).

A particularly preferred second introduction location for comonomer addition is on the recycle system. In a particularly preferred embodiment, the recycle system comprises a low pressure separator located in the recycle system for separating a process stream comprising components to be recycled into condensed liquid components to be recycled and gaseous components to be recycled, and the second introduction location is on or upstream of said separator.

By "low pressure separator" is meant a separator at a pressure of less than 0.5 MPa absolute (MPaa). The low pressure separator is preferably at a pressure of 0.4 MPaa or less (4 bara).

The second time is after the first time. In particular in this embodiment related to comonomer addition, but also in general terms for other reaction components the "second time" is preferably when operating at steady-state.

C. Condensing Agent as Reaction Component

In this embodiment, the reaction component to be added at the first and second locations is a condensing agent. The term "condensing agent" refers to compounds added to the process because they are readily condensed when cooled, and can then be recycled to the reactor in liquid form, wherein they vaporise. Typical condensing agents are alkanes such as isopentane.

The preferred locations for such compounds are discussed further below.

C.1. First Introduction Location

Preferably, the first introduction location when adding a condensing agent is a location on the recycle loop or the reactor. A particularly preferred location for the first injection location for condensing agent is on the reactor itself, on the separator, on a feed line to the separator, or on one of either the recycle gas line from the separator to the reactor and the recycle liquid line from the separator to the reactor.

In particular in this embodiment related to condensing agent addition, but also in general terms for other reaction components, it should be noted that the "first time" may be prior to catalyst injection (referred to herein as "pre-start-up") or may be during the start-up phase, the "start-up phase" being as defined previously. Additional of condensing agent at the first location during the start-up phase is preferred.

C.2. Second Introduction Location

A particularly preferred second introduction location for condensing agent addition is on the recycle system. In a particularly preferred embodiment, the recycle system comprises a low pressure separator located in the recycle system for separating a process stream comprising components to be recycled into condensed liquid components to be recycled and gaseous components to be recycled, and the second introduction location is on or upstream of said separator.

By "low pressure separator" is meant a separator at a pressure of less than 0.5 MPa absolute (MPaa). The low pressure separator is preferably at a pressure of 0.4 MPaa or less (4 bara)

The second time is after the first time. In particular in this embodiment related to condensing agent addition, but also in general terms for other reaction components the "second time" is preferably when operating at steady-state.

Some examples of "first time" and "second time" are described above.

More generally, in relation to the "first time" and the "second time", the second time is any time after the first time. Generally the "first time" and the "second time" may each be prior to catalyst injection (referred to herein as "pre-start-up"); during the start-up phase, the "start-up phase" being defined herein as the time after catalyst injection until the production rate exceeds 50% of the targeted steady-state production rate; between the start-up phase and steady-state operation; or when operating at steady-state.

In addition, the first and second times can be defined relative to a transition, wherein the polymerisation process switches from production of one polymer product to another polymer product. In such scenarios the first time may, for example, be during steady-state prior to transition or during the transition, and the second time may be during transition or during steady-state after the transition. The present invention may be particularly applied in transitions where the catalyst is changed.

EXAMPLES

General Process

A polymerisation process was performed in a fluidised bed polymerisation reactor system of the type shown schematically in FIG. 1.

The reactor was prepared by loading a seed bed of polymer in the reactor (1) and fluidising this with a hot reactive gas mixture comprising ethylene, 1-butene, hydrogen, nitrogen and iso-pentane which is circulated through the reactor. The reactor temperature is then adjusted to the desired reaction temperature. This takes place over several hours. During this time the separator (5) is partially filled with liquid iso-pentane ready for use during polymerisation.

Polymerisation is subsequently initiated by injecting a polymerisation catalyst into the reactor.

Fluidising gas recovered from the reactor via the gas outlet (2) is recycled to the reactor. Before catalyst injection the recovered gas is recycled without cooling via line 7, whilst line 6 is not used. Once polymerisation is initiated the recovered gas is cooled but not initially condensed. As reaction rate increases (and hence so does the heat of polymerisation it is required to remove) the cooling is increased such that the condensable components in the recycle gas are condensed in the condenser (4) and passed to a separator (5). The condensed components pass to the base of the separator displacing the isopentane already present, and liquid recycle to the reactor from the separator via line 6 is started. Non-condensed components continue to be recycled via line 7.

Comparative Example

In the Comparative Example triethyl aluminium is added as a scavenger directly to the reactor. It is fed at 2 kg/hr for 4 hours prior to reaction, after which time water analysers on the recycle loop show that impurity levels are suitable for start-up (<1 ppm vol), and continued at the same rate once reaction has commenced.

Reaction starts as expected. As the cooling is increased leading to condensation of the recycle gas, and recycle of this condensed liquid starts, the catalyst activity is seen to reduce and hot spots appear on the reactor wall (generally a sign of agglomerate formation).

Analysis of the reactor gas phase composition identifies the presence of water which is acting to poison the catalyst, despite the fact that scavenger has been fed to the reactor over several hours prior to this.

The reaction is terminated and the reactor further scavenged and then purged to remove the water.

Example 1

During the start-up phase prior to catalyst injection to the reactor 2 kg of pure triethyl aluminium is fed to the base of the separator (5) into the iso-pentane and circulated for one hour. This is then purged and the base of the separator refilled with fresh isopentane.

The reaction is generally otherwise initiated as described above.

On injection of catalyst to the reactor the trialkylaluminium feed is changed to that it is then fed directly to the reactor i.e. as in the Comparative Example.

Reaction starts up as expected. No signs of excessive water are observed in the gas phase in the reactor.

The invention claimed is:

1. A process for the polymerisation of olefins in a polymerisation reactor system, the polymerisation reactor system comprising a reactor and further comprising at least first and second introduction points by which the same reaction component may be introduced directly at different locations on the reactor system, the process comprising:
   (i) at a first time introducing the reaction component through at least the first introduction point and such that a proportion X of the reaction component which is introduced through said first and second introduction points is introduced through the first introduction point, and
   (ii) at a second, later, time introducing the same reaction component through at least the second introduction point and such that a proportion Y of the reaction component which is introduced through said first and second introduction points is introduced through the first introduction point,
   wherein Y is less than X,
   and further wherein at least one of the first and second introduction points is located on the reactor system at a location not on the reactor.

2. A process according to claim 1 wherein X is greater than 0.2.

3. A process according to claim 1 wherein Y is less than 0.5.

4. A process according to claim 1 wherein Y is less than or equal to X−0.1.

5. A process according to claim 1 wherein flow is switched entirely from introduction through the first introduction point but not the second introduction point at the first time, to introduction through the second introduction point but not the first introduction point at the second time.

6. A process for the polymerisation of olefins in a polymerisation reactor system, the polymerisation reactor system comprising at least a first introduction point and a second introduction point, the process comprising introducing the same reaction component directly at different locations on the reactor system, wherein at a first time the reaction component is introduced through the first introduction point but not the second introduction point, and at a second, later, time the same reaction component is introduced through the second introduction point but not the first introduction point.

7. A process according to claim 1 wherein the polymerisation reactor system comprises
   (i) a gas phase reactor having a gas outlet and one or more withdrawal lines for withdrawal of a polymer-containing stream,
   (ii) a recycle loop for recycling gas exiting the reactor through the gas outlet back to the reactor,
   (iii) a polymer separation system for separating reactants from the polymer product in the withdrawn polymer-containing stream, and
   (iv) a recycle system for recycling reactants removed from the reactor in the withdrawn polymer-containing stream back to the reactor.

8. A process according to claim 7 wherein the at least one location at which at least one of the first and second introduction points is located which is part of the reactor system other than the reactor is at least one location where the reaction component is introduced directly into one or more of the recycle loop, the polymer separation system and the recycle system.

9. A process according to claim 7 wherein the at least one location which is part of the reactor system other than the reactor is such that reaction component is introduced into a vessel which is in the recycle loop, in the polymer separation system or in the recycle system, or in a line or equipment other than a vessel which is upstream of such vessel.

10. A process according to claim 1 wherein the at least one location which is part of the reactor system other than the reactor is such that the reaction component is not passed to the reactor directly nor via any fresh feed lines which themselves feed directly to the reactor.

11. A process according to claim 1 wherein the at least one location which is part of the reactor system other than the reactor is such that the reaction component introduced at this location is not introduced directly in any line which line itself feeds directly to the reactor.

12. A process according to claim 1 wherein the "first time" is prior to catalyst injection ("pre-start-up") or during the start-up phase, the start-up phase being defined herein as the time after catalyst injection until the production rate exceeds 50% of the targeted steady-state production rate.

13. A process according to claim 1 wherein the "second time" is during the start-up phase, between the start-up phase and steady-state operation or at steady-state operation.

14. A process according to claim 1 wherein the reaction component is selected from the group consisting of scavengers, comonomers and condensing agents.

15. A process according to claim 4 wherein the polymerisation reactor system comprises
   (i) a gas phase reactor having a gas outlet and one or more withdrawal lines for withdrawal of a polymer-containing stream,
   (ii) a recycle loop for recycling gas exiting the reactor through the gas outlet back to the reactor,
   (iii) a polymer separation system for separating reactants from the polymer product in the withdrawn polymer-containing stream, and
   (iv) a recycle system for recycling reactants removed from the reactor in the withdrawn polymer-containing stream back to the reactor.

16. A process according to claim 15 wherein the at least one location at which at least one of the first and second introduction points is located which is part of the reactor system other than the reactor is at least one location where the reaction component is introduced directly into one or more of the recycle loop, the polymer separation system and the recycle system.

17. A process according to claim 15 wherein the at least one location which is part of the reactor system other than the reactor is such that reaction component is introduced into a vessel which is in the recycle loop, in the polymer separation system or in the recycle system, or in a line or equipment other than a vessel which is upstream of such vessel.

18. A polymerisation reactor system comprising:
   (a) a first introduction point connected to a source of a reaction component and by which the reaction component may be introduced directly to the polymerisation reactor system at a first location,
   (b) a second introduction point connected to the same source of a reaction component and by which the reaction component may be introduced directly to the polymerisation reactor system at a second location different to the first location, and
   (c) a control system which controls the supply of the reaction component to the polymerisation reactor system and which prevents the reaction component being introduced through both the first and second introduction points at the same time.

19. A process according to claim 2 wherein X is greater than 0.5.

20. A process according to claim 4 wherein Y is less than or equal to X−0.5.

* * * * *